United States Patent [19]

Duncan

[11] 4,143,099

[45] Mar. 6, 1979

[54] METHOD OF PREPARING A THERMOPLASTIC ELASTOMERIC BLEND OF MONOOLEFIN COPOLYMER RUBBER AND POLYOLEFIN RESIN

[75] Inventor: David J. Duncan, Boksburg, South Africa

[73] Assignee: Uniroyal Limited, Midlothian, Scotland

[21] Appl. No.: 684,982

[22] Filed: May 10, 1976

[30] Foreign Application Priority Data

May 12, 1975 [GB] United Kingdom ............... 19793/75

[51] Int. Cl.$^2$ ................................................ C08L 23/00
[52] U.S. Cl. ........................... 260/897 A; 260/45.85 S; 260/45.85 B; 526/37; 526/52.2
[58] Field of Search .................... 260/889, 896, 897 A

[56] References Cited

U.S. PATENT DOCUMENTS 3,806,558  4/1974  Fisher ............................... 260/897 A

*Primary Examiner*—J. Ziegler
*Attorney, Agent, or Firm*—James J. Long

[57] ABSTRACT

A method of preparing a thermoplastic elastomeric blend comprising mixing from 90 to 10 parts by weight of monoolefin copolymer rubber with correspondingly from 10 to 90 parts by weight of polyolefin resin having tertiary hydrogen and a free radical generating curing agent therefor, masticating and shearing the mixture to produce a semi-cure of the rubber, completing the semi-cure before the onset of melting of the polyolefin resin, and ensuring that once the polyolefin has melted the level of free radicals remaining in the mixture is not sufficient to cause substantial degradation of the polyolefin.

18 Claims, No Drawings

METHOD OF PREPARING A THERMOPLASTIC ELASTOMERIC BLEND OF MONOOLEFIN COPOLYMER RUBBER AND POLYOLEFIN RESIN

This invention relates to a thermoplastic elastomeric blend and a method of making such a blend.

Thermoplastic elastomers, which can be processed and fabricated by methods used for thermoplastics, and which do not require vulcanisation to develop elastomeric properties, are known. U.S. Pat. No. 3,806,558 discloses such a blend having highly desirable characteristics and that can be fabricated by such methods as molding and extrusion, into shaped articles, which do not require a vulcanisation step to develop good physical properties. Furthermore, the blends can be re-processed, like a thermoplastic material.

The above mentioned specification describes the production of a blend of a monoolefin copolymer rubber, typified by saturated EPM (ethylene-propylene copolymer rubber) or unsaturated EPDM (ethylene-propylene-non-conjugated diene terpolymer rubber), with a polyolefin resin, typified by polyethylene or polypropylene, by subjecting the mixture to the action of a conventional curing agent while the mixture is masticated. The curing conditions are such that the cure of the blend is only partial, that is, the blend is cross-linked to the state where it becomes less soluble in the usual solvents for the uncured blend. A blend of monoolefin rubber with a polyolefin resin, which has thus been partially cured or cured-linked under dynamic conditions, provides a thermoplastic material having very desirable characteristics.

In carrying out the process described in the aforesaid U.S. Patent the blend of monoolefin copolymer rubber and polyolefin resin is mixed with a small amount of curative and subjected to curing conditions while masticating and shearing the mixture. The amount of curative and the curing conditions are so selected as to produce only a partial cure as evidenced by conventional tests suitable for determining the degree of cure or cross-linking of a polymer.

In making such blends, difficulty may be experienced when attempting to make a blend in which the polyolefin resin has tertiary hydrogen groups and is present in the blend in more than 25% by weight of the rubber and resin together and when a free radical generating curing agent is used. In these blends the polyolefin may have a tendency to degrade and the mass may become sticky and difficult to process.

According to the present invention we prepare a thermoplastic elastomeric blend by mixing from 90 to 10 parts by weight of monoolefin copolymer rubber with correspondingly from 10 to 90 parts by weight of polyolefin resin having tertiary hydrogen groups and a free radical generating curing agent therefor, masticating and shearing the mixture to produce a semi-cure of the rubber, completing the semi-cure before the onset of melting of the polyolefin resin and ensuring that once the polyolefin has melted the level of free radicals remaining in the mixture is not sufficient to cause substantial degradation (i.e., deterioration as evidenced by eventual development of stickiness and consequent poor processing) of the polyolefin.

Once the semi-cure of the rubber has been completed there is no further need for free radicals in the blend, and by ensuring that virtually no free radicals from the curing agent are left in the mixture by the time the polyolefin melts it is found that degradation of the polyolefin can be prevented and stickiness of the blend avoided.

Although the invention can be used in blends where the rubber/resin ratio is from 90/10 to 10/90 it finds particular utility where the percentage by weight of the polyolefin is 25% or more (i.e., 25 to 90% of the blend and the percentage by weight of the monoolefin copolymer rubber is correspondingly 75% or less (i.e., 75 to 10%) of the blend. Mixtures of these proportions have been particularly difficult to process because of the problem of stickiness and the invention solves this problem. Blends with such proportions are desirable for some applications as generally speaking the hardness and tensile strength of the finished product increases with increasing polyolefin.

The simplest way to ensure substantial exhaustion of the free radicals is by suitable selection of the curing agent. Preferably the curing agent is a peroxide curing agent and should have completed three half-lives by the onset of melting of the polyolefin. Thus, peroxide curing agents having a ten hour half-life temperature of less than 100° C. and/or a one hour half-life temperature of less than 120° C. are preferred.

As it may be difficult or dangerous to use peroxides having low stability it is further preferred that the ten hour half-life temperature of the peroxide be not less than 50° C. Amongst preferred curing agents may be listed 2,4-dichlorobenzoyl peroxide, benzoyl peroxide, p-chlorobenzoyl peroxide, caprylyl peroxide, decanoyl peroxide, lauroyl peroxide, isonanoyl peroxide, di-isononanoyl peroxide, pelargonyl peroxide, succinic acid peroxide, acetyl peroxide, and 1,1-bis(t-butylperoxy)-3,3,5-trimethylcyclohexane. The peroxide curing agent may be a peroxy ester, suitable examples of which are t-butyl peroxyneodecanoate, t-butyl peroxypivalate, 1,1,3,3-tetramethylbutyl peroxy-2-ethylhexanoate, 2,5-dimethyl-2,5-bis (2-ethylhexanoyl peroxy) hexane, t-butyl peroxy-2-ethylhexanoate, t-butyl peroxyisobutyrate, t-butyl peroxymaleic acid and 2,5-dimethyl-2,5-bis (benzoyl peroxy) hexane. Alternatively, the peroxide curing agent may be a peroxy carbonate or dicarbonate, suitable examples of which are t-butylperoxy isopropyl carbonate, 00-t-butyl O-isopropyl monoperoxycarbonate, di(n-propyl) peroxydicarbonate, diisopropyl peroxydicarbonate, di(sec-butyl) peroxydicarbonate, dicyclohexyl peroxydicarbonate, t-butyl peroxydicarbonate and dibenzyl peroxydicarbonate. Blends of peroxides may be used, and free radical generating curing agents other than peroxides may be used. Clearly, the amount of curing agent used should also be selected to avoid excess curing agent in the blend, which could lead to the presence of free radicals after the onset of melting of the resin, and could also lead to undesirable over cure of the rubber. It is preferred that the amount of the active constituent of the curing agent not exceed 1 part per 100 parts of the rubber and resin blend, and for most processes desirably 0.2 part or less should be used.

It is possible to include in the blend an activating agent for the curing agent, effective to cause the curing agent to produce free radicals at a temperature lower then its normal activation temperature. This may be advantageous with some curing agents having ten-hour half-life temperatures below 100° C. and/or one-hour half-life temperatures below 120° C. and may allow curing agents particularly, for example, hydroperoxide curing agents with ten-hour half-life temperatures above 100° C. to be used. Activating agents suitable for use may be amines and mercaptans such as tetramethylene pentamine, dimethyl aniline and docecyl mercaptan.

It is also possible to ensure that the free radical level at the onset of melting of the resin is as low as required by adding to the blend after the semi-cure of the rubber is complete and before onset of melting, a scavenging agent, such as a stabilizer or antioxidant, which will deactivate or absorb remaining free radicals. Any conventional stabilizer or antioxidant may be used, for example amine types, phenolic types, sulphides, and phosphites. This technique requires reasonably accurate temperature control if it is to be used with curing agents having a ten hour half-life temperature above 100° C., and it is not preferred.

The monoolefin copolymer rubber employed in the blend of the invention is an essentially amorphous, random, elastomeric copolymer of two or more monoolefins, with or without at least one copolymerizable polyene. Usually two monoolefins are used, but three or more may be used. Ordinarily one of the monoolefins is ethylene while the other is preferably propylene, frequently in ethylene:propylene weight ratio of from 90:10 to 20:80. However, other alpha-monoolefins may be used including those of the formula $CH_2 = CHR$ where R is an alkyl radical having for example 1 to 12 carbon atoms (e.g. butene-1, pentene-1, hexene-1, 4-methylpentene-1, 5-methylhexene-1, 4-ethylhexene-1 etc.). The monoolefin copolymer rubber may be a saturated material, for example an ethylene-propylene binary copolymer rubber or may be unsaturated by including in the copolymer a small amount (e.g., 2–20% by weight) of at least one copolymerizable polyene to confer unsaturation on the copolymer. Although conjugated dienes such as butadiene or isoprene may be used for this purpose, in practice it is usual to employ a nonconjugated diene, such as an openchain nonconjugated diolefin or a cyclic diene. Examples of such dienes are 1,4-hexadiene, dicyclopentadiene, 5-methylene-2-norbornene, 5-ethylidene-2-norbornene, 1,3- or 1,5-cyclooctadiene, methyltetrahydroindene, etc. The polyenes employed are not limted to those having only two double bonds, but include those having three or more double bonds.

The polyolefin resin with which the monoolefin copolymer rubber is mixed to make the blend of the invention is a solid, high molecular weight resin made by polymerizing such olefins as propylene, butene-1, pentene-1, 3-methylbutene-1 and 4-methylpentene-1 in conventional manner. Copolymers of these olefins may also be used. Polypropylene is a preferred polyolefin resin, having highly crystalline isotactic and syndiotactic forms. Frequently the density of polypropylene is from 0.800 to 0.980 g/cc, and isotactic polypropylene having a density of from 0.900 to 0.910 g/cc. may be particularly preferred. The onset of melting of polypropylene occurs at about 160° C. Thus, when polypropylene is used in the blend there should be virtually no free radicals remaining by the time the blend temperature approaches 160° C.

The desired semi-cure of the blend of monoolefin copolymer rubber and polyolefin resin is brought about by mixing the rubber and resin with a small amount of the curing agent, and subjecting the mixture to curing conditions while shearing or masticating the blend. It will be understood that the curing or cross-linking parameters (viz., the amount of curing agent, the curing temperature, the curing time) will be so selected as to produce a semi-cure rather than a full or substantially complete cure. In many cases, the use of less than ½, or use of less than ⅓, and in some cases ¼ or less, of the amount of curative conventionally required for full cure, is capable of producing the desired degree of semi-cure in the blend.

To effect the semi-cure, the rubber, resin, and curing agent mix may be worked on an open roll mill, or in an internal mixer, such as a Banbury/(Trade Mark) mixer, an extruder-mixer or a transfer mixer.

Preferably blending is effected in a high-speed Banbury internal mixer, and the time taken is about 3 to 5 minutes starting with a Banbury preheated to about 100° C. The final temperature reached by the mix should be sufficient to have melted the resin and formed a uniform blend. A final temperature of about 200° C. is often suitable.

Pigments, fillers, stabilisers, ultra-violet screening agents, certain process oils or other compounding or modifying ingredients can be included in the blend if so desired.

Blends according to the invention may be used to manufacture various articles by such methods as extrusion, screw-injection, injection or compression moulding, calendering, vacuum forming and blow moulding. In certain of these forming operations a considerable amount of scrap is produced. Scrap produced from the blend of the invention may, however, be reprocessed several times and still retain its advantageous characteristics.

If desired a lubricant may be included in the blend of the invention; this may be advantageous in improving the extruding quality of the composition. Any lubricant conventionally used in rubber or resins may be used in conventional amount, for example from 0.2 to 3 parts per 100 parts of the blend. The lubricant may be added after the mixing of the blend has been substantially completed, and may be added to the mixer or to the blend after it has been unloaded from the mixer.

The following examples, in which all quantities are expressed by weight, will illustrate the practice of the invention in more detail.

EXAMPLE 1

The rubber, polyolefin resin, curing agent and magnesium oxide as shown in Table 1 below were loaded into a high speed Banbury internal mixer. In runs 4 to 14, mixing was carried out at about 155 r.p.m. until the temperature of the mixture reached an actual value of about 160° C., the flux temperature of the polypropylene, and the stabilizer was then added. In runs 1 to 3 the stabilizer was added at an actual temperature of about 190° C. Mixing continued until the mixture reached an actual temperature of about 200° C. The mixing time taken to 160° C. was about 2½ to 3 minutes, and the time then taken to reach 200° C. was about a further 1 to 1½ minutes. After mixing, the blend was unloaded on to a two-roll mill and formed into a strip.

TABLE 1

| Run number | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Vistalon 6505 | 80 | 70 | 60 | 60 | 60 | 60 | 60 | 60 | 60 | 60 | 60 | 60 | 60 | 60 |
| Vestolen P4200 | 20 | 30 | 40 | 40 | 40 | 40 | 40 | 40 | 40 | 40 | 40 | 40 | 40 | 40 |

TABLE 1-continued

| Run number | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Stabiliser | 2.0 | 2.0 | 2.0 | 2.0 | 2.0 | 2.0 | 2.0 | 2.0 | 2.0 | 2.0 | 2.0 | 2.0 | 2.0 | 2.0 |
| Maglite D | 0.4 | 0.4 | 0.4 | 0.4 | 0.4 | 0.4 | 0.4 | 0.4 | 0.4 | 0.4 | 0.4 | 0.4 | 0.4 | 0.4 |
| Varox | 0.4 | 0.4 | 0.4 | — | — | — | — | — | — | — | — | — | — | — |
| (active constituent) | 0.2 | 0.2 | 0.2 | — | — | — | — | — | — | — | — | — | — | — |
| Lucidol G20 | — | — | — | 0.2 | 0.4 | 0.6 | 0.8 | 1.0 | — | — | — | — | — | — |
| (active constituent) | — | — | — | 0.04 | 0.08 | 0.12 | 0.16 | 0.2 | — | — | — | — | — | — |
| Trigonox 29/40 | — | — | — | — | — | — | — | — | 0.2 | 0.3 | 0.5 | 1.0 | 1.5 | 2.0 |
| (active constituent) | — | — | — | — | — | — | — | — | 0.08 | 0.12 | 0.2 | 0.4 | 0.6 | 0.8 |
| Tensile Strength (psi) | 763 | 1040 | S | 1416 | 1396 | 1396 | 1325 | 1471 | 1380 | 1349 | 1585 | 1369 | 1300 | 1276 |
| Elongation at break (%) | 147 | 364 | S | 153 | 165 | 191 | 239 | 246 | 210 | 230 | 200 | 105 | 70 | 30 |
| Compression set (%) | 57 | 56 | S | 84 | 86 | 82 | 80 | 80 | 91 | 90 | 80 | 83 | 79 | 76 |
| Hardness (Shore A) | 77 | 87 | S | 95 | 94 | 95 | 95 | 95 | 96 | 96 | 96 | 96 | 95 | 96 |

*Runs 1, 2 and 3 are outside the scope of the invention.

S indicates that the blend was too sticky to process properly. Vistalon 6505 is an ethylene/propylene/ethylidenenorbornene terpolymer made by Exxon Chemical Co., it has an ethylene/propylene ratio of 53/47, an Iodine number of 17 and a Mooney viscosity ML-4 at 100° C. of 55. Vestolen P4200 is polypropylene made by Chemische Werke Huls and is largely crystalline, isotactic polypropylene having a 5 Kg. melt flow index at 190° C. as determined by ASTM D1238-70 condition P of about 4g/10 mins., and a specific gravity of 0.906 gm/cc. The stabiliser is a mixture of dilaurylthiodipropionate and tetrakis (methylene-3-(3′,5′-di-t-butyl-4′-hydroxyphenol)proprionate) methane. Maglite D is magnesium oxide. Varox is 50% inert filler and 50% 2,5-dimethyl-2,5-bis(t-butyl peroxy) hexane; it has a ten hour half-life temperature of 119° C. and a one hour half-life temperature of 138° C. Lucidol G20 is 80% inert filler and 20% benzoyl peroxide, which has a ten hour half-life temperature of 73° C. and a one hour half-life temperature of 91° C. Trigonox 29/40 is 60% inert filler and 40% 1,1-bis(t-butylperoxy)-3,3,5-trimethylcyclohexane, having a ten hour half-life temperature of 92° C. and a one hour half life temperature of 113° C.

The tests were carried out on samples cut from injection moulded plaques of the material from each run to obtain the tensile strength and elongation at break figures. A Type 1 Dumbbell was cut from the plaque and tested at 20° C. on an Instron tensometer with a cross head speed of 51 cm per minute generally in accordance with BS 903 Part A2, 1971. Compression set was measured following the principles of ASTM D395 method B, the set being measured after 22 hours at 70° C.

From the Table it will be seen that runs 1 to 3 employed a peroxide with a high activation temperature. The peroxide has not completed one half-life by the onset of melting of the resin, causing degradation of the polypropylene.

The blend from run 1 processed well through the Banbury and the mill stages. The level of polypropylene in the blend was not sufficiently high for the degradation of the resin to result in stickness causing processing difficulties. The blend from run 2 was satisfactory in the Banbury, but displayed some stickiness on the mill, needing a cooled mill to sheet it properly. The blend from run 3 was very sticky in the Banbury and unprocessable on the mill. It banded around both rolls, having a consistency somewhat like that of hot toffee, and had to be chiselled off the rolls. The blends from runs 4 to 12 all handled well on the mill after dropping from the Banbury in a single piece. The strength of the strip from the mill was good and the material diced easily. In these runs the peroxide used has a low activation temperature. In runs 4 to 8 the peroxide had completed about four half-lives by the time the mix had reached 160° C., in runs 9 to 14 the peroxide had completed about three half-lives. There were very few free radicals left in the blend when the temperature was 160° C. The stabiliser was added to improve the stability and lower the degradation rate of the finished blend during its life.

All of runs 4 to 12 produced blends with good tensile strength. The blends of runs 13 and 14 suffered from some degree of overcure because of the higher levels of peroxide used. The tensile stength was thus somewhat lower, and the elongation at break was very much lower. The elongation at break of the blends from runs 4 to 11 was satisfactory, as was that from run 1. The blend from run 2 exhibited a high elongation at break figure, which is indicative of the degradation of the polypropylene by the curing agent. The blends from runs 4 to 14 were all capable of being injection moulded and extruded to give finished products. Some surface roughness was observed on the extrudates from blends processed with higher quantities of curing agent.

The Maglite D need not be added to the Banbury with the polymers and may be added with the stabiliser. Runs 4 to 8 were repeated with this modification and indicated that a small increase in tensile strength was achieved in this way.

EXAMPLE 2

This example shows that it is not necessary to add the stabiliser to the blend at or below the flux temperature of the polypropylene when curing agents having low ten hour half-life temperatures are used.

TABLE 2

| Run number | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|
| Vistalon 6505 | 60 | 60 | 60 | 60 | 60 | 60 | 60 | 60 | 60 | 60 | 60 | 60 | 60 | 60 | 60 | 60 | 60 | 60 |
| Vestolen P4200 | 40 | 40 | 40 | 40 | 40 | 40 | 40 | 40 | 40 | 40 | 40 | 40 | 40 | 40 | 40 | 40 | 40 | 40 |
| Stabiliser | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Time of Addition | B | A | B | A | B | A | B | A | B | A | B | A | B | A | B | A | B | A |
| Maglite D | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Lucidol G20 | 0.2 | 0.2 | 0.6 | 0.6 | 1.0 | 1. | — | — | — | — | — | — | — | — | — | — | — | — |
| (active constituent) | 0.04 | 0.04 | 0.12 | 0.12 | 0.20 | 0.20 | — | — | — | — | — | — | — | — | — | — | — | — |
| Trigonox 29/40 | — | — | — | — | — | — | 0.1 | 0.1 | 0.3 | 0.3 | 0.5 | 0.5 | — | — | — | — | — | — |
| (active constituent) | — | — | — | — | — | — | 0.04 | 0.04 | 0.12 | 0.12 | 0.20 | 0.20 | — | — | — | — | — | — |
| Varox | — | — | — | — | — | — | — | — | — | — | — | — | — | — | 0.08 | 0.08 | — | — |

TABLE 2-continued

| Run number | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|
| (active constituent) | — | — | — | — | — | — | — | — | — | — | — | — | 0.04 | 0.04 | — | — | — | — |
| Perkadox 14/40 | — | — | — | — | — | — | — | — | — | — | — | — | — | — | 0.3 | 0.3 | 0.5 | 0.5 |
| (active constituent) | — | — | — | — | — | — | — | — | — | — | — | — | — | — | 0.12 | 0.12 | 0.20 | 0.20 |
| Tensile Strength (psi) | 1416 | 1305 | 1396 | 1405 | 1471 | 1326 | 1428 | 1440 | 1389 | 1347 | 1416 | 1315 | 1272 | 1356 | 1169 | S | S | S |
| Elongation at Break (%) | 153 | 215 | 191 | 207 | 246 | 249 | 148 | 188 | 235 | 257 | 238 | 290 | 246 | 273 | 426 | S | S | S |
| Compression set (%) | 84 | 85 | 82 | 84 | 80 | 82 | 85 | 81 | 77 | 81 | 80 | 76 | 87 | 84 | 72 | S | S | S |
| Hardness (Shore A) | 95 | 94 | 95 | 96 | 95 | 96 | 95 | 96 | 97 | 97 | 95 | 96 | 96 | 97 | 97 | S | S | S |

*Runs 27 through 32 are outside the scope of the invention.

B indicates that the stabiliser, as in Example 1, was added at about 160° C. immediately before the polypropylene fluxed; A indicates that the stabiliser was added at 200° C., after the polypropylene fluxed. S indicates that the blend was too sticky to process properly. Perkadox 14/40 is 60% inert filler and 40% bis(t-butyl isopropyl) benzene, it has a ten hour half-life temperature of 114° C. and a one hour half-life temperature of 130° C.

Runs 15 to 26 were made with peroxides having low ten hour half-life temperatures and it will be noted from comparing the results in adjacent columns that whether the stabiliser was added before or after the flux temperature was reached made little difference to the physical properties of the resultant blend. Furthermore, all the blends from 15 to 26 handled well in the Banbury and on the mill and there was no tendency to stickiness.

Runs 27 to 32 were made with peroxides having high ten hour half-life temperatures. Runs 27 and 29 showed low tensile strengths, presumably because the stabiliser was added before the peroxide was activated and therefore inhibited the cure. Adding the stabiliser later improved the tensile strength in run 28. The blend from run 27 exhibited some stickiness, those from runs 28 and 29 were quite sticky and those from runs 30 to 32 were so sticky as to be unprocessable.

EXAMPLE 3

This Example demonstrates the use of an ethylene-propylene copolymer. The copolymer used was Vistalon 404, made by Exxon Chemical Co., and containing by weight 45% ethylene and 55% propylene. The Mooney viscosity ML-4 at 100° C. is 40.

The rubber, polyolefin resin, curing agent and magnesium oxide shown in Table 3 below were loaded into a Banbury internal mixer. Mixing was carried out until the actual temperature of the batch reached about 160° C. and the stabiliser was then added. Mixing continued until an actual temperature of 200° C. was reached, and the blend was then unloaded on to a two-roll mill and formed into a strip.

TABLE 3

| Run number | 33 | 34 | 35 | 36 | 37 | 38 |
|---|---|---|---|---|---|---|
| Vistalon 404 | 60 | 60 | 60 | 60 | 60 | 60 |
| Vestolen P4200 | 40 | 40 | 40 | 40 | 40 | 40 |
| Stabiliser | 2.0 | 2.0 | 2.0 | 2.0 | 2.0 | 2.0 |
| Maglite D | 0.4 | 0.4 | 0.4 | 0.4 | 0.4 | 0.4 |
| Lucidol G20 | 0.5 | 1.0 | 2.0 | — | — | — |
| (active constituent) | 0.1 | 0.2 | 0.4 | — | — | — |
| Trigonox 29/40 | — | — | — | 0.5 | 1.0 | 2.0 |
| (active constituent) | — | — | — | 0.2 | 0.4 | 0.8 |
| Tensile Strength (psi) | 1427 | 1355 | 1419 | 1286 | 1147 | 1012 |
| Elongation at Break (%) | 347 | 245 | 305 | 330 | 363 | 430 |
| Compression Set (%) | 73 | 70 | 63 | 76 | 78 | 77 |
| Hardness (Shore A) | 95 | 95 | 95 | 90 | 91 | 94 |

The processing characteristics of these blends in the Banbury and on the mill were all good. The compounds extruded well, although slight surface roughness showed when 2 parts of peroxide was used, and they also gave good results when injection moulded.

EXAMPLE 4

This Example demonstrates the use of ethylene/propylene copolymers of different viscosities, and also of different polypropylene resins. The mixing process was as described for runs 4 to 14 in Example 1.

TABLE 4

| Run No | 39 | 40 | 41 | 42 | 43 | 44 | 45 |
|---|---|---|---|---|---|---|---|
| Rubber - type | K712 | K714 | K512 | K320 | K312 | V606 | DCO-054 |
| Mooney viscosity ML-4 at 100° C. | — | — | — | — | — | — | 40 |
| at 125° C. | 70 | 70 | 50 | 35 | 35 | 60 | — |
| Ethylene/propylene ratio | 56:44 | 53:47 | 59:41 | — | — | 52:48 | — |
| Iodine number | 10 | 18 | 10 | — | 10 | — | — |
| Rubber - parts | 60 | 60 | 60 | 60 | 60 | 60 | 60 |
| Resin - type | VP4200 | VP4200 | VP4200 | VP4200 | VP4200 | VP4200 | VP4200 |
| Melt Flow index (g/10mins) | — | — | — | — | — | — | — |
| Resin - parts | 40 | 40 | 40 | 40 | 40 | 40 | 40 |
| Stabiliser | 2.0 | 2.0 | 2.0 | 2.0 | 2.0 | 2.0 | 2.0 |
| Maglite D | 0.4 | 0.4 | 0.4 | 0.4 | 0.4 | 0.4 | 0.4 |
| Lucidol G20 | 0.5 | 0.5 | 0.6 | 0.6 | 0.6 | 0.5 | 0.5 |
| (active constituent) | 0.1 | 0.1 | 0.12 | 0.12 | 0.12 | 0.1 | 0.1 |
| Tensile strength (p.s.i.) | 1344 | 1339 | 1276 | 1306 | 1277 | 1253 | 1272 |
| Elongation at break (%) | 181 | 183 | 212 | 263 | 234 | 188 | 266 |
| Compression set (%) | 66 | 70 | 67 | 76 | 80 | 93 | 88 |
| Hardness (Shore A) | 95 | 95 | 95 | 94 | 95 | 95 | 95 |

TABLE 4-continued

| Run No | 46 | 47 | 48 | 49 | 50 | 51 |
|---|---|---|---|---|---|---|
| Rubber - type | V5630 | V404 | V5630 | R521 | R521 | R521 |
| Mooney viscosity | | | | | | |
| ML-4 at 100° C. | 100 | 40 | 100 | 45 | 45 | 45 |
| at 125° C. | — | — | — | — | — | — |
| Ethylene/ | | | | | | |
| propylene ratio | 68:32 | — | 68:32 | 50:50 | 50:50 | 50:50 |
| Iodine number | 16 | — | 16 | 10 | 10 | 10 |
| Rubber - parts | 50 | 50 | 50 | 60 | 60 | 60 |
| Resin - type | VP4200 | VP4200 | A10–5014 | A10-14 5014 | A10–5016 | PGWM-22 |
| Melt Flow | | | | | | |
| index (g/10mins | — | — | 3.5 | 3.5 | 5.0 | 4.0 |
| Resin - parts | 50 | 50 | 50 | 40 | 40 | 40 |
| Stabiliser | 2.0 | 2.0 | 2.0 | 2.0 | 2.0 | 2.0 |
| Maglite D | 0.4 | 0.4 | 0.4 | 0.4 | 0.4 | 0.4 |
| Lucidol G20 | 0.5 | 0.5 | 0.5 | 0.75 | 0.75 | 0.75 |
| (active constituent) | 0.1 | 0.1 | 0.1 | 0.15 | 0.15 | 0.15 |
| Tensile strength | 1622 | 1509 | 1580 | 1414 | 1228 | 1220 |
| (p.s.i.) | | | | | | |
| Elongation at | | | | | | |
| break (%) | 240 | 403 | 240 | 187 | 315 | 239 |
| Compression set (%) | 75 | 87 | 83 | 75 | 75 | 73 |
| Hardness | | | | | | |
| (Shore A) | 97 | 97 | 97 | 95 | 94 | 95 |

In the rubber type row K denotes "Keltan" (Trade Mark), "V" denotes "Vistalon", D denotes "Dutral" (Trade Mark) and R denotes "Royalene" (Trade Mark). Vistalon 606 (run 44) and Diutral CO-054 (run 45) are ethylene-propylene copolymers. The other rubbers are all terpolymers, the third monomer being dicyclopentadiene in Keltan 320 (run 42) and ethylidenenorbornene in all the other rubbers. Vistalon 5630 (runs 46 and 48) contains 30 parts per hundred rubber of a paraffinic process oil. In the polypropylene type row VP4200 is as described in Example 1. A denotes "Amoco" (Trade Mark) and P denotes "Propathene" (Trade Mark). The quoted melt flow indices of the polypropylene was measured according to ASTMD 1238–70 condition L at 2.16 kg/230° C.

The processing characteristics of all these blends in the Banbury and on the mill were good.

EXAMPLE 5

This Example demonstrates the use of different ratios of rubber and resin in the blend. The mixing process was as described for runs 4 to 14 in Example 1.

TABLE 5

| Run No | 52 | 53 | 54 | 55 | 56 | 57 | 58 | 59 | 60 | 61 |
|---|---|---|---|---|---|---|---|---|---|---|
| Vistalon 6505 | 50 | 50 | 50 | 50 | 50 | 50 | 50 | 80 | 80 | 80 |
| Royalene 521 | — | — | — | — | — | — | — | — | — | — |
| Vestolen P4200 | 50 | 50 | 50 | 50 | 50 | 50 | 50 | 20 | 20 | 20 |
| Stabiliser | 2.0 | 2.0 | 2.0 | 2.0 | 2.0 | 2.0 | 2.0 | 2.0 | 2.0 | 2.0 |
| Maglite D | 0.4 | 0.4 | 0.4 | 0.4 | 0.4 | 0.4 | 0.4 | 0.4 | 0.4 | 0.4 |
| Lucidol G20 | — | — | — | 0.25 | 0.5 | 0.75 | 1.0 | 0.5 | 1.0 | 2.0 |
| (active constituent) | — | — | — | 0.05 | 0.1 | 0.15 | 0.2 | 0.1 | 0.2 | 0.4 |
| Varox | 0.25 | 0.5 | 0.75 | — | — | — | — | — | — | — |
| (active constituent) | 0.125 | 0.25 | 0.375 | — | — | — | — | — | — | — |
| Tensile Strength (psi) | 1339 | S | S | 1623 | 1549 | 1479 | 1465 | 599 | 640 | 747 |
| Elongation at break (%) | 309 | S | S | 134 | 215 | 216 | 272 | 199 | 182 | 110 |
| Compression set (%) | 68 | S | S | 73 | 68 | 65 | 67 | 66 | 61 | 61 |
| Hardness (Shore A) | 98 | S | S | 95 | 96 | 96 | 97 | 75 | 75 | 76 |

| Run No | 62 | 63 | 64 | 65 | 66 | 67 | 68 | 69 | 70 |
|---|---|---|---|---|---|---|---|---|---|
| Vistalon 6505 | 80 | — | — | — | — | — | — | — | — |
| Royalene 521 | — | 20 | 20 | 30 | 30 | 30 | 50 | 50 | 50 |
| Vestolen p4200 | 20 | 80 | 80 | 70 | 70 | 70 | 50 | 50 | 50 |
| Stabiliser | 2.0 | 2.0 | 2.0 | 2.0 | 2.0 | 2.0 | 2.0 | 2.0 | 2.0 |
| Maglite D | 0.4 | 0.4 | 0.4 | 0.4 | 0.4 | 0.4 | 0.4 | 0.4 | 0.4 |
| Lucidol G20 | 3.0 | 0.5 | 0.75 | 0.5 | 1.0 | 1.5 | 0.5 | 1.0 | 1.5 |
| (active constituent) | 0.6 | 0.1 | 0.15 | 0.1 | 0.2 | 0.3 | 0.1 | 0.2 | 0.3 |
| Varox | — | — | — | — | — | — | — | — | — |
| (active constituent) | — | — | — | — | — | — | — | — | — |
| Tensile Strength (psi) | 773 | 3437 | 3401 | 2940 | 3044 | 2967 | 1640 | 1614 | 1655 |
| Elongation at break (%) | 96 | 120 | 106 | 156 | 118 | 77 | 223 | 301 | 258 |
| Compression set (%) | 56 | 98 | 93 | 96 | 86 | 86 | 81 | 81 | 80 |
| Hardness (Shore A) | 77 | 71* | 71* | 65* | 65* | 65* 97 | 97 | 97 | |

*Shore D Hardness.
S indicates too sticky to be processed.
Runs 52, 53 and 54 are outside the scope of the invention.

By varying the ratio of rubber to resin it is possible to obtain materials with widely differing physical properties. Except in runs 52 to 54 wherein a high decomposition temperature curing agent was used all materials had good processing characteristics in the Banbury and on the mill. The material of run 52 was only just processable and had to be chiselled from the mill.

EXAMPLE 6

This demonstrates the use of other peroxide curing agents. The mixing process was as described for runs 4 to 14 in Example 1.

In the following Table Laurydol is lauroyl peroxide of 98% minimum activity, and has a 10 hour half life temperature of 62° C. and a one hour half life temperature of 80° C. t-butyl peroctoate is a liquid persester of 95% activity, and has a 10 hour half life temperature of 77° C. and a one hour half life temperature of 92° C. All the materials have good processing characteristics in the Banbury and on the mill.

TABLE 6

| Run No | 71 | 72 | 73 | 74 | 75 | 76 | 77 | 78 | 79 | 80 | 81 | 82 |
|---|---|---|---|---|---|---|---|---|---|---|---|---|
| Royalene 521 | 60 | 60 | 60 | 60 | 60 | 70 | 50 | 60 | 60 | 60 | 60 | 60 |
| Vestolen P4200 | 40 | 40 | 40 | 40 | 40 | 30 | 50 | 40 | 40 | 40 | 40 | 40 |
| Stabiliser | 1.0 | 1.0 | 1.0 | 1.0 | 1.0 | 1.0 | 1.0 | 1.0 | 1.0 | 1.0 | 1.0 | 1.0 |
| Maglite D | 0.4 | 0.4 | 0.4 | 0.4 | 0.4 | 0.4 | 0.4 | 0.4 | 0.4 | 0.4 | 0.4 | 0.4 |
| Laurydol | 0.05 | 0.1 | 0.15 | 0.2 | 0.3 | 0.15 | 0.15 | — | — | — | — | — |
| t-butyl peroctoate | — | — | — | — | — | — | — | 0.4 | 0.8 | 0.12 | 0.16 | 0.2 |
| Tensile Strength (psi) | 1495 | 1427 | 1441 | 1426 | 1471 | 1059 | 1805 | 1262 | 1250 | 1277 | 1290 | 1311 |
| Elongation at Break (%) | 216 | 215 | 232 | 210 | 251 | 212 | 205 | 226 | 240 | 228 | 275 | 278 |
| Compression set (%) | 81 | 79 | 82 | 79 | 82 | 82 | 81 | 91 | 94 | 88 | 84 | 81 |
| Hardness (Shore A) | 94 | 94 | 94 | 95 | 95 | 87 | 98 | 99 | 94 | 94 | 95 | 95 |

I claim:

1. A method of preparing a thermoplastic elastomeric blend comprising mixing from 75 to 10 parts by weight of monoolefin copolymer rubber with correspondingly from 25 to 90 parts by weight of polyolefin resin having tertiary hydrogen and a free radical generating peroxide curing agent therefor having a ten hour half-life temperature of from not less than 50° C. to less than 100° C., the amount of the active constituent of the curing agent in the blend not exceeding 1 part by weight per 100 parts of said rubber and resin together, masticating and shearing the mixture at an elevated temperature sufficient to produce a semi-cure of the rubber but below the temperature of melting of the polyolefin resin, and completing the said semi-cure before the onset of melting of the polyolefin resin thereby ensuring that once the polyolefin has melted the level of free radicals remaining in the mixture is not sufficient to cause substantial degradation of the polyolefin as evidenced by stickiness, the final temperature reached by the mixture after completing the said semi-cure being sufficient to melt the resin and form a uniform blend.

2. A method according to claim 1 in which the monoolefin copolymer rubber is an essentially amorphous, random, elastomeric copolymer of at least two monoolefins, and optionally, at least one copolymerisable polyene.

3. A method according to claim 2 in which the monoolefin copolymer rubber is an ethylene/propylene copolymer.

4. A method according to claim 2 in which the monoolefin copolymer rubber is a terpolymer of ethylene propylene and a copolymerisable diene.

5. A method according to claim 4 in which the copolymerisable diene is selected from the group consisting of 1,4-hexadiene, dicyclopentadiene and 5-ethylidene-2-norbornene.

6. A method according to claim 4 in which the copolymerisable diene is 1,4-hexadiene.

7. A method according to claim 4 in which the copolymerisable diene is dicyclopentadiene.

8. A method according to claim 4 in which the copolymerisable diene is 5-ethylidene-2-norbornene.

9. A method according to claim 1 in which the polyolefin resin is polypropylene.

10. A method according to claim 1 in which the curing agent is selected so that during masticating and shearing of the blend the curing agent has completed three half-lives by the onset of melting of the polypropylene.

11. A method according to claim 1 in which the curing agent has a one hour half-life temperature of less than 120° C.

12. A method according to claim 1 in which the curing agent is benzoyl peroxide.

13. A method according to claim 1 in which the curing agent is selected from the group comprising 1,1-bis(t-butylperoxy)-3,3,5-trimethylcyclohexane, lauroyl peroxide and t-butyl peroctoate.

14. A method according to claim 1 in which the amount of the active constituent of the curing agent in the blend does not exceed 0.2 part by weight per 100 parts of rubber and resin together.

15. A method according to claim 1 in which included in the mixture is an activating agent for the curing agent selected from the group consisting of amine activating agents and mercaptan activating agents, effective to cause the curing agent to produce free radicals at a temperature lower than its normal activation temperature.

16. A method according to claim 1 in which a scavenging agent is added to the mixture after the semi-cure of the rubber is complete and before the onset of melting of the resin.

17. A method according to claim 16 in which the scavenging agent is a stabiliser for the resultant semi-cured blend.

18. A method according to claim 17 in which the stabiliser is a mixture of dilaurylthio dipropionate and tetrakis (methylene-3-(3',5'-di-t-butyl-4'-hydroxyphenol) propionate) methane.

* * * * *